United States Patent
Ward et al.

(10) Patent No.: US 6,451,169 B1
(45) Date of Patent: Sep. 17, 2002

(54) STRUCTURALLY RIGID POLYMER COAGULANTS AS RETENTION AND DRAINAGE AIDS IN PAPERMAKING

(75) Inventors: William J. Ward, Glen Ellyn; Andrew J. Dunham, DeKalb, both of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/740,546

(22) Filed: Dec. 20, 2000

(51) Int. Cl.⁷ .................... D21H 17/46; D21H 21/10
(52) U.S. Cl. .................... 162/164.1; 162/164.6; 162/168.3; 162/181.6; 162/181.8; 162/183
(58) Field of Search ............ 162/164.1, 164.3, 162/164.6, 165, 183, 181.6, 181.8, 168.3

(56) References Cited

U.S. PATENT DOCUMENTS

| | | | | |
|---|---|---|---|---|
| 3,344,122 A | * | 9/1967 | Perrine | 162/164.3 |
| 3,715,335 A | * | 2/1973 | Bacskai | 162/164.3 |
| 4,370,443 A | * | 1/1983 | Wesseler | 162/164.1 |
| 4,749,753 A | | 6/1988 | Nishihara et al. | |
| 5,501,774 A | * | 3/1996 | Burke | 162/164.6 |
| 5,733,414 A | * | 3/1998 | Stockwell | 162/165 |

FOREIGN PATENT DOCUMENTS

| | | |
|---|---|---|
| GB | 1 572 135 | 7/1980 |
| JP | 1987-29251 | 10/1997 |

OTHER PUBLICATIONS

N. Sarkar et al., "Rigid Rod Water Soluble Polymers", Journal of Applied Polymer Science, 62, 393–408 (1996).

* cited by examiner

*Primary Examiner*—Peter Chin
(74) *Attorney, Agent, or Firm*—Michael B. Martin; Thomas M. Breininger

(57) ABSTRACT

This invention concerns a method of increasing retention and drainage in a papermaking furnish comprising adding to the furnish an effective amount of a structurally rigid polymeric coagulant and an effective flocculating amount of a flocculant and a microparticle.

10 Claims, No Drawings

STRUCTURALLY RIGID POLYMER COAGULANTS AS RETENTION AND DRAINAGE AIDS IN PAPERMAKING

TECHNICAL FIELD

This invention is directed to a method for increasing retention and drainage in a papermaking furnish using structurally rigid polymeric coagulants in combination with a flocculant and a microparticle.

BACKGROUND OF THE INVENTION

In the manufacture of paper, a papermaking furnish is formed into a paper sheet. The to papermaking furnish is an aqueous slurry of cellulosic fiber having a fiber content of about 4 weight percent (percent dry weight of solids in the furnish) or less, and generally around 1.5% or less, and often below 1.0% ahead of the paper machine, while the finished sheet typically has less than 6 weight percent water. Hence the dewatering and retention aspects of papermaking are extremely important to the efficiency and cost of the manufacture.

Gravity dewatering is the preferred method of drainage because of its relatively low cost. After gravity drainage more expensive methods are used for dewatering, for instance vacuum, pressing, felt blanket blotting and pressing, evaporation and the like. In actual practice a combination of such methods is employed to dewater, or dry, the sheet to the desired water content. Since gravity drainage is both the first dewatering method employed and the least expensive, an improvement in the efficiency of this drainage process will decrease the amount of water required to be removed by other methods and hence improve the overall efficiency of dewatering and reduce the cost thereof.

Another aspect of papermaking that is extremely important to the efficiency and cost is retention of furnish components on and within the fiber mat. The papermaking furnish represents a system containing significant amounts of small particles stabilized by colloidal forces. The papermaking furnish generally contains, in addition to cellulosic fibers, particles ranging in size from about 5 to about 1000 nm consisting of, for example, cellulosic fines, mineral fillers (employed to increase opacity, brightness and other paper characteristics) and other small particles that generally, without the inclusion of one or more retention aids, would in significant portion pass through the spaces (pores) between the mat formed by the cellulosic fibers on the papermachine.

Greater retention of fines, fillers, and other components of the furnish permits, for a given grade of paper, a reduction in the cellulosic fiber content of such paper. As pulps of lower quality are employed to reduce papermaking costs, the retention aspect of papermaking becomes more important because the fines content of such lower quality pulps is generally greater. Greater retention also decreases the amount of such substances lost to the whitewater and hence reduces the amount of material costs, the cost of waste disposal and the adverse environmental effects therefrom. It is generally desirable to reduce the amount of material employed in a papermaking process for a given purpose, without diminishing the result sought. Such add-on reductions may realize both a material cost savings and handling and processing benefits.

An important method of enhancing dewatering while improving the retention of cellulosic fines, mineral fillers and other furnish components on the fiber mat employs an inorganic microparticle in combination with a coagulant and a polymeric flocculant. In such a system a coagulant is first added, followed by the flocculant and the microparticle.

The coagulant is generally a low molecular weight synthetic cationic polymer or cationic starch. The coagulant may also be an inorganic coagulant such as alum or polyaluminum chlorides. The coagulant addition can take place at one or several points within the furnish make up system, including but not limited to the thick stock, white water system, or thin stock of a machine. The coagulant generally reduces the negative surface charges present on the particles in the furnish, such as cellulosic fines and mineral fillers, and thereby accomplishes a degree of agglomeration of such particles. Further, in the presence of other detrimental anionic species, the coagulant serves to neutralize the interfering species enabling aggregation with the subsequent addition of a flocculant.

The flocculant generally is a high molecular weight synthetic polymer which bridges the particles and/or agglomerates, from one surface to another, binding the particles into larger agglomerates. The presence of such large agglomerates in the furnish, as the fiber mat of the paper sheet is being formed, increases retention. The agglomerates are filtered out of the water onto the fiber web, whereas unagglomerated particles would, to a great extent, pass through such a paper web. In such a program the order of addition of the microparticle and flocculant can be reversed successfully.

However, there is continuing need to develop improved agents for improving the retention and drainage performance of the papermaking furnish, thereby increasing the efficiency of pulp or paper manufacture.

SUMMARY OF THE INVENTION

Structurally rigid polymers have been used as substitutes for pulp in papermaking (U.S. Pat. No. 4,749,753; Japanese Patent Application 1987-29251), but not as process additives. We have discovered that adding structurally rigid polymeric coagulants to papermaking furnishes results in a substantial improvement of the retention and drainage properties of the furnishes.

Accordingly, in its principal embodiment, this invention is directed to a method of increasing retention and drainage in a papermaking furnish comprising adding to the furnish an effective amount of a structurally rigid polymeric coagulant and an effective flocculating amount of a flocculant and a microparticle.

DETAILED DESCRIPTION OF THE INVENTION

Definitions of Terms

"Structurally rigid polymers" means polymers having a structure where the rotational conformation (degrees of freedom) of the polymer are restricted compared with common flexible polymeric materials. Structural rigidity is imparted to the polymeric coagulants described herein by incorporating rigid components such as alkenyl, alkynyl, cyloalkyl, heterocyclyl, aryl and heteroaryl groups along the main chain of the polymer. The structurally rigid polymers may be composed entirely of rigid components, or the rigid components may be connected by flexible chains such as alkyl or ether groups, so long as introduction of the flexible groups does not substantially effect the overall rigidity of the polymer. Further, the structurally rigid polymers should be water-soluble or water-dispersable and have cationic charge.

"Cyclic ditertiary amine" means an aromatic or aliphatic monocyclic or multicyclic ring system of formula

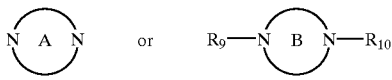

where "A" and "B" denote, respectively, a monocyclic, bicyclic or fused aromatic or aliphatic ring system of from about 5 to about 10 ring atoms and $R_9$ and $R_{10}$ are alkyl of from one to about 4 carbon atoms. The nitrogen atoms are separated by at least one ring atom, preferably by at least two ring atoms. Where the cyclic ditertiary amine is aliphatic, the nitrogen atoms are further substituted with alkyl. Preferably, the alkyl groups are connected to form a bridged heterocylic ring. The cyclic ditertiary amine is optionally substituted with one or more substituents selected from alkyl, alkoxy and haloalkyl. Preferred cyclic ditertiary amines are 1,4-diazabicyclo[2.2.2]octane, 4,4-dipyridine, pyrazine and 1,4-dimethylpiperazine. A more preferred cyclic ditertiary amine is 1,4-diazabicyclo[2.2.2]octane.

"Acyclic ditertiary amine" means an amine of formula

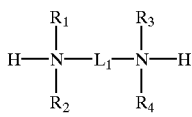

where $R_1$–$R_4$ are alkyl and $L_1$ is $C_1$–$C_6$ alkylene, $C_2$–$C_6$ alkenylene, $C_2$–$C_6$ alkynylene, arylene, heteroarylene heterocycylene or cycloalkylene. Preferred acyclic ditertiary amines are N,N,N',N'-tetramethyl-2-butene-1,4-diamine, N,N,N',N'-tetramethyldiaminomethane, N,N,N',N'-tetramethyl-2,2-diaminopropane and N,N,N',N'-tetramethyl-1,4-diaminocyclohexane. N,N,N',N'-Tetramethyl-1,4-diaminocyclohexane is more preferred.

"Cyclic dihalide" means an aliphatic cylcoalkyl of formula

where "C" denotes a cycloalkyl of from about 5 to about 10 carbon atoms and X is halogen. The halogen-substituted carbon atoms are separated by at least one carbon atom, preferably by at least two carbon atoms. The cyclic dihalide is optionally substituted with one or more substituents selected from alkyl, alkoxy and haloalkyl. A preferred cyclic dihalides is 1,4-dichlorocyclohexane.

"Acyclic dihalide" means dihalide of formula

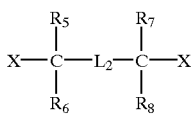

where X is halogen, $L_2$ is $C_2$–$C_6$ alkylene, $C_2$–$C_6$ alkenylene, $C_2$–$C_6$ alkynylene, arylene, heteroarylene heterocycylene or cycloalkylene and $R_5$–$R_8$ are independently selected from hydrogen and alkyl. Preferred acyclic dihalides are 1,4-dichloro-2-butyne, trans-1,4-dichloro-2-butene, α,α'-dichloro-p-xylene and 1,3-dichloro-2,2-dimethylpropane. A more preferred acyclic dihalide is 1,4-dichloro-2-butyne.

"Alkyl" means a monovalent group derived from a straight or branched chain saturated hydrocarbon by the removal of a single hydrogen atom. Representative alkyl groups include methyl, ethyl, n- and iso-propyl, and the like.

"Alkylene" means a divalent group derived from a straight or branched chain saturated hydrocarbon by the removal of two hydrogen atoms. Representative alkylene groups include methylene, ethylene, propylene, and the like.

"Alkenylene" means a divalent group derived from a straight or branched chain hydrocarbon containing at least one carbon-carbon double bond. Representative alkenylene include —CH=CH—, —CH$_2$CH=CH—, —C(CH$_3$)=CH—, —CH$_2$CH=CHCH$_2$—, and the like.

"Alkynylene" means a divalent group derived by the removal of two hydrogen atoms from a straight or branched chain acyclic hydrocarbon group containing a carbon-carbon triple bond. Representative alkynylene include —CH≡CH—, —CH≡CH—CH$_2$—, —CH≡CH—CH(CH$_3$)—, and the like.

"Alkoxy" and "alkoxyl" mean an alkyl-O— group wherein alkyl is defined herein. Representative alkoxy groups include methoxyl, ethoxyl, propoxyl, butoxyl, and the like.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy or haloalkyl groups. Representative aryl groups include phenyl or naphthyl, or substituted phenyl or substituted naphthyl.

"Arylene" means a divalent group derived from an aryl as defined herein by the removal of two hydrogen atoms, provided that in no cases are the hydrogen atoms on adjacent carbon atoms.

"Cycloalkyl" means a non-aromatic mono- or multicyclic ring system of about 5 to about 10 carbon atoms. Preferred ring sizes of rings of the ring system include about 5 to about 6 ring atoms. The cycloalkyl is optionally substituted with one one or more substituents selected from alkyl, alkoxy and haloalkyl. Representative monocyclic cycloalkyl include cyclopentyl, cyclohexyl, cycloheptyl, and the like. Representative multicyclic cycloalkyl include 1-decalin, norbornyl, adamant-(1- or 2-)yl, and the like.

"Cycloalkylene" means a divalent group derived from a cycloalkyl as defined herein by the removal of two hydrogen atoms, provided that in no cases are the hydrogen atoms on adjacent carbon atoms.

"Heteroaryl" means an aromatic monocyclic or multicyclic ring system of about 5 to about 10, preferably from about 5 to about 6 ring atoms, in which one or more of the atoms in the ring system is/are element(s) other than carbon, for example nitrogen, oxygen or sulfur. The heteroaryl is optionally substituted with one one or more substituents selected from alkyl, alkoxy and haloalkyl. Representative heteroaryl groups include pyridyl, quinolyl, furyl, benzofuryl, thienyl, thiazolyl, pyrimidyl, indolyl, and the like.

"Heteroarylene" means a divalent group derived from a heteroaryl as defined herein by the removal of two hydrogen atoms, provided that in no cases are the hydrogen atoms on adjacent ring atoms.

"Heterocyclyl" means a non-aromatic saturated monocyclic or multicyclic ring system of from about 5 to about 10 ring atoms, in which one or more of the atoms in the ring system is/are element(s) other than carbon, for example nitrogen, oxygen or sulfur. Preferred ring sizes of rings of the ring system include about 5 to about 6 ring atoms. The heterocyclyl is optionally substituted by one or more alkyl, alkoxy or haloalkyl groups. Representative heterocyclyl rings include piperidyl, pyrrolidinyl, piperazinyl, morpholinyl, thiomorpholinyl, thiazolidinyl, 1,3-dioxolanyl, 1,4-dioxanyl, tetrahydrofuranyl, tetrahydrothiophenyl, tetrahydrothiopyranyl, and the like.

"Heterocyclylene" means a divalent group derived from a heterocyclyl as defined herein by the removal of two hydrogen atoms, provided that in no cases are the hydrogen atoms on adjacent ring atoms.

"Halogen" and "halo" mean fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Flocculant" means a chemical agent that is added to a papermaking furnish to assist in the agglomeration of small particles and thereby increase the retention and drainage properties of the furnish. The flocculant may be a non-ionic, anionic or cationic polymer having a molecular weight of at least about 500,000, preferably of at least about 1,000,000 and more preferably of at least about 5,000,000. The flocculant may be used in the solid form, as an aqueous solution, as water-in-oil emulsion, or as dispersion in water.

"Nonionic flocculant" means homopolymers, copolymers or terpolymers and so on of nonionic monomers. Representative nonionic monomers include acrylamide, methacrylamide, N-tertiary butyl acrylamide, N-vinylformamide, N-vinylpyrrolidone, N-vinylpiperidone, N-vinylcaprolactam, N-vinyl-3-methylpyrrolidone, N-vinypyrrolidone, N-vinylpiperidone, N-vinylcaprolactam, N-vinyl-3-methylpyrrolidone, N-vinyl-5-methylpyrirrolidone, N-vinyl-5-phenylpyrrolidone, N-vinyl-2-oxazolidone, N-vinylimidazole, vinylacetate, maleimide, N-vinylmorpholinone, polyethylene oxide (PEO), and the like. Preferred nonionic monomers are acrylamide, methacrylamide and N-vinylformide. Preferred nonionic flocculants are poly(acrylamide), poly(methacrylamide) and poly (N-vinylformamide).

The dosage of nonionic flocculant is preferably from about 0.001 to about 0.5% (as actives) by weight based on total solids in the slurry, more preferably from about 0.003 to about 0.2% and most preferably from about 0.007 to about 0.1%.

"Cationic flocculant" means any water-soluble polymer of (meth)acrylamide or any water-soluble polymer of N-vinylformamide or related monomers which carries or is capable of carrying a cationic charge when dissolved in water. Representative cationic copolymers of (meth) acrylamide include copolymers of (meth)acrylamide with dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate or methyl chloride, Mannich reaction modified polyacrylamides, diallylcyclohexylamine hydrochloride (DACHA\HCI), diallyldimethylammonium chloride (DADMAC), methacrylamidopropyltrimethylammonium chloride (MAPTAC) and allyl amine (ALA).

"Anionic flocculant" any polymer comprised of anionic and nonionic monomers means which carries or is capable of carrying a cationic charge when dissolved in water. Representative anionic monomers include acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water-soluble alkali metal, alkaline earth metal, and ammonium salts thereof. The choice of anionic monomer is based upon several factors including the ability of the monomer to polymerize with the desired comonomer, the use of the produced polymer, and cost. A preferred anionic monomer is acrylic acid. Preferred anionic flocculants are copolymers of acrylamide and acrylic acid.

The dosage of anionic flocculant is from about 0.001 to about 1%, preferably from about 0.01 to about 0.5% and more preferably from about 0.02 to about 0.25% by weight based on total solids in the slurry.

"Zwitterionic flocculant" means a polymer composed from zwitterionic monomers and, possibly, other non-ionic monomer(s). Representative zwitterionic polymers include homopolymers such as the homopolymer of N,N-dimethyl-N-(2-acryloyloxyethyl)-N-(3-sulfopropyl) ammonium betaine, copolymers such as the copolymer of acrylamide and N,N-dimethyl-N-(2-acryloyloxyethyl)-N-(3-sulfopropyl) ammonium betaine, and terpolymers such as the terpolymer of acrylamide, N-vinyl-2-pyrrolidone, and 1-(3-sulfopropyl)-2-vinylpyridinium betaine. The use of zwitterionic flocculants in papermaking is described in U.S. patent application Ser. No. 09/349,054, incorporated herein by reference.

"Microparticle" means highly charged materials that improve flocculation when used together with natural and synthetic macromolecules. They constitute a class of retention and drainage chemicals defined primarily by their submicron size. A three dimensional structure, an ionic surface, and a submicron size are the general requirements for effective microparticles.

Microparticle programs enhance the performance of current retention programs and optimize wet end chemistry, paper quality and paper machine efficiency. Microparticles are not designed to be used as a sole treatment. Rather, they are used in combination with other wet end additives to, improve retention and drainage on the paper machine. Commonly used microparticles include:

i) copolymers of acrylic acid and acrylamide;

ii) bentonite and other clays;

iii) dispersed silica based materials;

iv) colloidal borosilicate; and v) naphthalene sulfonate/formaldehyde condensate polymers.

Representative copolymers of acrylic acid and acrylamide are described in U.S. Pat. No. 5,098,520, incorporated herein by reference.

Bentonites useful as the microparticle for this process include: any of the materials commercially referred to as bentonites or as bentonite-type clays, i.e., anionic swelling clays such as sepialite, attapulgite and montmorillonite. In addition, bentonites described in U.S. Pat. No. 4,305,781 are suitable. A preferred bentonite is a hydrated suspension of powdered bentonite in water.

Representative dispersed silicas have an average particle size of from about 1 to about 100 nanometers (nm), preferably from about 2 to about 25 nm, and more preferably from about 2 to about 15 nm. This dispersed silica, may be in the form of colloidal, silicic acid, silica sols, fumed silica, agglomerated silicic acid, silica gels and precipitated silicas, so long as the particle size or ultimate particle size is within the above ranges. Dispersed silica in water with a typical particle size of about 4 nm is available from Nalco Chemical Company, Naperville, Ill.

Representative borosilicates are described in Patent Cooperation Treaty Patent Application No. PCT/US98/

19339, incorporated herein by reference. Colloidal borosilicate is available from Nalco Chemical Company, Naperville, Ill.

Naphthalene sulfonate/formaldehyde condensate polymers useful as microparticles are available from Nalco Chemical Company, Naperville, Ill.

Other suitable microparticles include the structurally-rigid polymers disclosed in U.S. Patent application Ser. No. 09/740,548 filed concurrently herewith, titled "Structurally Rigid Nonionic and Anionic Polymers as Retention and Drainage Aids in Papermaking", incorporated herein by reference.

The amount of microparticle added is from about 0.05 to about 5.0, preferably from about 1.5 to about 4.5 and more preferably about 2 to about 4.5 pounds microparticle/ton.

"Pounds microparticle/ton" means pounds of actual microparticle per 2000 pounds of solids present in slurry. The abbreviation for pounds of actual microparticle per 2000 pounds of solids present in slurry is "lbs microparticle/ton".

The microparticle is added to the papermaking furnish either before or after the flocculant is added to the furnish. The choice of whether to add the microparticle before or after the flocculant can be made by a person of ordinary skill in the art based on the requirements and specifications of the papermaking furnish.

Preferred Embodiments

The structurally rigid polymeric coagulants of this invention are prepared by condensation polymerization of one or more cyclic ditertiary amines with one or more cyclic or acyclic dihalides condensation polymerization of one or more acyclic ditertiary amines with one or more cyclic dihalides in a polar solvent such as DMF, acetonitrile, DMSO or water, or mixtures thereof. A preferred solvent is a 70:30 mixture of DMF or acetonitrile and water. Reaction temperatures can range from about ambient temperature to about 100° C., preferably from about 40° C. to about 60° C. Reaction times can range from a few hours to several days, preferably from about 10 to about 24 hours.

The structurally-rigid coagulants have a molecular weight of from about 1000 to about 100,000, preferably from about 5000 to about 10,000.

In a preferred aspect of this invention, the cyclic ditertiary amine is 1,4-diazabicyclo[2.2.2]octane.

In another preferred aspect, the acyclic dihalide is 1,4-dihalobutyne or α,α'-dihalo-p-xylene.

In a more preferred aspect, the structurally rigid polymeric coagulant is poly(1,4-diazabicyclo[2.2.2]octane/1,4-dichloro-2-butyne) or poly(1,4-diazabicyclo[2.2.2]octane/α,α'-dichloro-p-xylene).

In another preferred aspect, the flocculant is poly(acrylic acid/acrylamide).

In another preferred aspect, the microparticle is colloidal borosilicate.

In another preferred aspect, the papermaking furnish is selected from fine paper, board, and newsprint papermaking furnishes.

In another preferred aspect, this invention is directed to a polymer composition comprising a condensation polymer of 1,4-diazabicyclo[2.2.2]octane and an alkynyl dihalide or an α,α'-dihalo-p-xylene.

In another preferred aspect, this invention is directed to a polymer composition comprising poly(1,4-diazabicyclo[2.2.2]octane/1,4-dichloro-2-butyne); or poly(1,4-diazabicyclo[2.2.2]octane/α,α'-dichloro-p-xylene).

In addition to the structurally rigid coagulant, the flocculant and the microparticle, additional additives such as talc, cationic starch, cationic coagulant, or mixtures thereof may be added anywhere in the system.

The appropriate dosage of structurally rigid coagulant is determined by adding different doses of the structurally rigid coagulant to a papermaking slurry either before, concurrently with, or after the addition of either a flocculant alone or a flocculant followed by a microparticle. The performance of the combined chemical additions is monitored with the focused beam reflectance microscope (FBRM) or other appropriate evaluative measurement (Britt jar, dynamic drainage analyzer, etc.). The range of doses is preferably from about 1 to about 20, more preferably from about 1 to about 8 pounds of structurally rigid coagulant/ton product.

Generally the structurally rigid coagulant is added before the flocculant and microparticle, though exceptions are practiced in the industry. When the coagulant is added before the flocculant, it is added either to the white water, the thick stock, or the thin stock. The preferred addition point is the thick stock pulp before dilution with white water.

Alternatively, the structurally rigid coagulant is added at several points in the papermaking process, including concurrently with the flocculant or microparticle.

This application results in increased cleanliness of the papermaking operation which otherwise experiences hydrophobic deposition effecting both productivity and the quality of paper.

The foregoing may be better understood by reference to the following Examples, which are presented for purposes of illustration and are not intended to limit the scope of this invention.

EXAMPLE 1

Synthesis of rigid copolymers formed from condensation of a cyclic diteriary amine and an acyclic dihalide is illustrated by the following preparation of poly(1,4-diazabicyclo[2.2.2]octane/1,4-dichloro butyne).

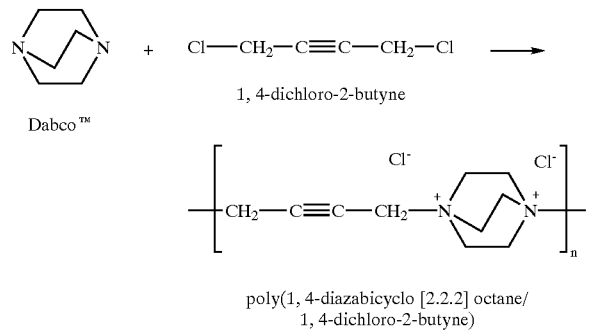

Into a reaction flask equipped with a magnetic stirring bar, reflux condenser, and nitrogen inlet is placed 50 ml of dry acetonitrile and 2.00 g of 1,4-diazabicyclo[2.2.2]octane (Dabco™, available from Aldrich Chemical Co., Milwaukee, Wis.). The mixture is stirred and purged with nitrogen until a homogeneous solution is obtained. To this is injected, at once, 2.18 g (one equivalent) of 1,4-dichloro-2-butyne. A slight exotherm is observed, and a solid suspension formed almost immediately. To the reaction mixture is then added 5.0 ml of dionized water, and the mixture is heated to 60° C. for one hour. After this time, an additional 30 ml of water is added in order to create a homogeneous solution. The mixture is held at 60° C. for an additional 7 hours. At the end of this time the reaction is cooled, and the solvent removed by rotary evaporation. The resulting viscous golden oil is dried further under high vacuum at room temperature. The resulting solid is crushed to a powder form and analyzed. The structure of the water soluble solid is determined by NMR to be consistent with the polymer structure shown above. The weight average molecular weight is approximately 7400 AMU (GPC, polysaccharide standards).

EXAMPLE 2

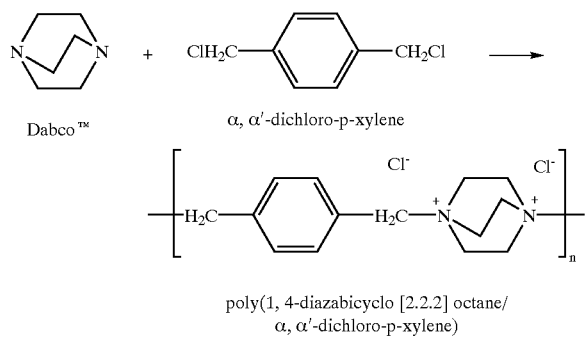

poly(1, 4-diazabicyclo [2.2.2] octane/
α, α'-dichloro-p-xylene)

Poly(1,4-diazabicyclo[2.2.2]octane/α,α'-dichloro-p-xylene) is prepared according to the method of Example 1, except substituting α,α'-dichloro-p-xylene for 1,4-dichloro-2-butyne. The weight average molecular weight is approximately 8000 AMU (GPC, polysaccharide standards).

EXAMPLE 3

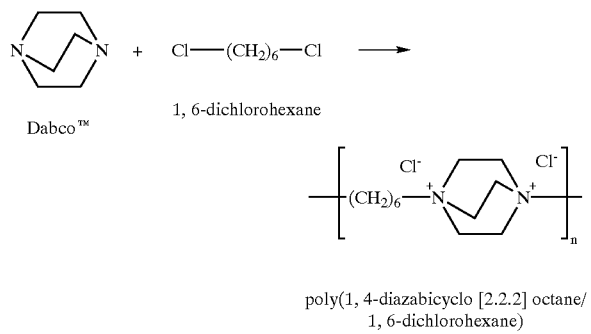

poly(1, 4-diazabicyclo [2.2.2] octane/
1, 6-dichlorohexane)

Poly(1,4-diazabicyclo[2.2.2]octane/1,6-dichlorohexane) is prepared according to the method of Example 1, except substituting 1,6-dichlorohexane for 1,4-dichloro-2-butyne.

EXAMPLE 4

The effectiveness of a coagulant/flocculant/microparticle program using the structurally rigid coagulant of this invention is demonstrated using an analytical technique that measures the mean chord lengths while flocculation is effected in a model system. This measurement is performed using a commercially available scanning laser microscope (M100F, Lasentec Corporation, Redmond, Wash., USA). In this technique, a 780 nm diode laser is coupled into the sample of interest via a fiber optic bundle and focused to an elliptical beam waist of about $0.8\mu \times 2\mu$. The focused beam is then scanned through the solution in a circular motion (rotating lens) at a velocity of 2 m/s.

When the beam crosses a particle or particle floc, some of the light is reflected back into the probe, and transmitted via fiber optics to an avalanche photodiode detector. The duration of time that this back-scattered light is "seen" by the detector is proportional to the size of the particle scanned by the beam. Since the scanning velocity of the laser is known (2 m/s), the time taken for the laser to scan across a particle chord can be converted into a particle chord length. The scanning velocity of the laser is much faster than the particle velocity for all reasonable mixing velocities of the sample (<1800 rpm), thus the measurements are not influenced by sample flow velocities. The chord length determination depends solely on the pulse duration of the back-scattered light, therefore, this technique is relatively insensitive to variations in floc reflectivity or density which is problematic with other particle sizing techniques.

The back-scattered light signal is filtered, and the number of individual pulses exceeding a minimum threshold signal level are counted and binned according to their duration. The magnitude of this signal threshold increases as the overall reflected signal strength increases. Essentially only the single particle events above the background reflectance intensity are used to characterize the chord lengths. Typically 1500–3000 total pulses per second are observed. These binned back-scattered light pulses are used to form a histogram, where the number of observed particles per unit time are plotted as a function of chord length. Typical histograms contained 38 bins with chord length sizes ranging from 0.8 to 1000 microns. The histogram of the chord length distribution can be used to calculate a variety of parameters including mean, median, mode, and skewness.

The furnish samples used for these experiments is a 60/40 blend of drylap source hardwood and softwood Kraft pulp obtained from a Midwestern pulp mill. These drylap source pulps are beaten to a CSF (Canadian Standard Freeness) of 370(5) mls for the hardwood and 374(6) mls for the softwood pulp. This mixture of Kraft pulps is then diluted to a consistency of 0.4% by weight with a synthetic tap water solution containing 1.50 mM $CaCl_2$, 2.20 mM $NaCO_3$, and 0.75 mM $MgSO_4$. Filler ($CaCO_3$, Omyafil, Omya Inc.) is added at 0.1% by weight, to yield a total furnish solids consistency of 0.5% by weight. Just prior to the experiment, 10 lbs/ton of a cationic starch (Solvitose N, Avebe) is added to the furnish. The desired amount of the particular polymer to be tested is then added to the reaction vessel, equipped for use with the scanning laser microscope as follows.

The 200-mm stirrer shaft within the reaction vessel carries a four-blade propeller. Each blade is 7 wide and 1 mm thick with a tip-to-tip distance of 50 mm between opposite blades (diameter of arc swept by propeller). The blades have a rectangular shape with a pitch of 45°. The bottom of the blades are set ~1 mm above the bottom of the mixing vessel and the top of the blades are set ~10 mm below the sapphire probe window. The motor shaft rotation is clockwise so that the push of the propeller blades is upward toward the sapphire windows. The sapphire window is at a depth of 60 mm below the solution/air interface of the containment beaker. The cylindrical probe (25 mm diameter) is an effective baffle enhancing vertical mixing of the solutions.

A vessel thus modified is used in a standard Britt Jar experiment for evaluation of treatments. For each experiment, 300 mL of the desired furnish is added to a 500 mL beaker (Pyrex No. 1040). The mixture is stirred for at least ten seconds before initiating any trial. For the experiments where cationic polyacrylamide is added, cationic starch is added five minutes before the polymer addition. The starch pretreatment created a reproducible, transient instrument response which equilibrated after two minutes of mixing. The equilibrated starch-containing furnish is chosen as the initial, standard state for polymer additions and no further work examining starch effects are explored. The probe and stirrer are wiped clean and rinsed with deionized water between experiments. No effects related to window fouling are observed over the time period of the experiments.

The data obtained using representative structurally-rigid coagulants are compared to a representative coagulant in Table 1. A higher value for mean chord length indicates that a higher amount of flocculation has occurred. The data illustrate that the coagulating capability of the representative rigid coagulant polymer poly(1,4-diazabicyclo[2.2.2]octane/1,4-dichloro butyne) is comparable to that of a conventional coagulant, poly(epichlorohydrin/dimethylamine), yet the rigid polymers are of much lower molecular weight. The data for poly(1,4-diazabicyclo[2.2.2]octane/1,6-dichlorohexane) indicate that coagulating activity is lost when a sufficiently flexible alkyl chain is introduced into the polymer.

Also, addition of a rigid polymer to a solution is expected to reduce solution viscosity, which is also advantageous in treatments designed for the pulp and paper industries.

culating amount of a flocculant and a microparticle, wherein structural rigidity is imparted to the coagulant by incorporating a sufficient rigidity-imparting amount of one or more groups selected from alkenyl, alkynyl, cyloalkyl, heterocyclyl, aryl and heteoaryl into the main chain of the coagulant polymer.

2. The method of claim 1 wherein the structurally polymeric coagulant is selected from the group consisting of condensation polymers of one or more cyclic ditertiary amines with one or more cyclic or acyclic dihalides and condensation polymers of one or more acyclic ditertiary amines with one or more cyclic dihalides.

3. The method of claim 2 wherein the structurally-rigid coagulant has a molecular weight of from about 1000 to about 100,000.

4. The method of claim 3 wherein the cyclic ditertiary amine is 1,4-diazabicyclo[2.2.2]octane.

5. The method of claim 4 wherein the acyclic dihalide is 1,4-dihalobutyne or $\alpha,\alpha'$-dihalo-p-xylene.

6. The method of claim 1 wherein the structurally rigid polymeric coagulant is poly(1,4-diazabicyclo[2.2.2]octane/1,4-dichloro-2-butyne); or poly(1,4-diazabicyclo[2.2.2]octane/$\alpha,\alpha'$-dichloro-p-xylene).

7. The method of claim 1 wherein the flocculant is poly(acrylic acid/acrylamide).

8. The method of claim 1 wherein the microparticle is colloidal borosilicate.

9. The method of claim 1 wherein the papermaking furnish is selected from fine paper, board, and newsprint papermaking furnishes.

TABLE 1

| | Change in Chord Length (um) | | | | | |
|---|---|---|---|---|---|---|
| | poly(Dabco ™/DCB)[1] | | poly(Dabco ™/DCH)[2] | | poly(Epi/DMA)[3] | |
| Dose (# Active/ton solids) | and poly(Ac/Am)[4] | and poly(AcAm) and colloidal borosilicate[5] | and poly(AcAm) | and poly(AcAm) and colloidal borosilicate | and poly(AcAm) | and poly(AcAm) and colloidal borosilicate |
| 0 | 50.5 | 6.61 | 50.5 | 6.61 | 50.5 | 6.61 |
| 0.5 | 62.41 | 10.02 | 57.33 | 6.95 | 51.97 | 7.41 |
| 0.75 | 61.31 | 9.08 | 53.11 | 6.57 | 55.88 | 15.58 |
| 1.0 | 52.12 | 12.04 | 56.17 | 6.1 | 55.8 | 15.28 |

[1]coagulant poly(1,4-diazabicyclo[2.2.2]octane/1,4-dichloro butyne).
[2]coagulant poly(1,4-diazabicyclo[2.2.2]octane/1,6-dichlorohexane).
[3]coagulant poly(epichlorohydrin/dimethylamine), available from Nalco Chemical Company, Naperville, IL.
[4]flocculant poly(acrylic acid/acrylamide), available from Nalco Chemical Company, Naperville, IL. The flocculant dose is 2 lbs/ton.
[5]Microparticle available from Nalco Chemical Company, Naperville, IL. The microparticle dose is 2 lbs/ton.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims:

What is claimed is:

1. A method of increasing retention and drainage in a papermaking furnish comprising adding to the furnish an effective amount of a cationic, water soluble or dispersible structurally rigid polymeric coagulant and an effective floc- 10. A paper product prepared by i) adding to a papermaking furnish an effective coagulating amount of a cationic, water soluble or dispersible structurally rigid polymeric coagulant and an effective flocculating amount of a flocculant and a microparticle; and ii) draining the furnish to form a sheet, wherein structural rigidity is imparted to the coagulant by incorporating a sufficient rigidity-imparting amount of one or more groups selected from alkenyl, alkynyl, cyloalkyl, heterocyclyl, aryl and heteoaryl into the main chain of the coagulant polymer.

* * * * *